United States Patent
Aytur et al.

(10) Patent No.: US 7,804,884 B2
(45) Date of Patent: Sep. 28, 2010

(54) PACKET DETECTION IN TIME/FREQUENCY HOPPED WIRELESS COMMUNICATION SYSTEMS

(75) Inventors: Turgut Aytur, Plattsburgh, NY (US); Stephan ten Brink, Irvine, CA (US); Ravishankar H. Mahadevappa, Irvine, CA (US); Venkatesh Rajendran, Irvine, CA (US); Ran Yan, Holmdel, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 829 days.

(21) Appl. No.: 11/205,506

(22) Filed: Aug. 16, 2005

(65) Prior Publication Data

US 2006/0050800 A1    Mar. 9, 2006

Related U.S. Application Data (60) Provisional application No. 60/601,828, filed on Aug. 16, 2004.

(51) Int. Cl.
  *H04B 1/713* (2006.01)
  *H04K 1/10* (2006.01)
  *H04L 27/28* (2006.01)

(52) U.S. Cl. .................. 375/136; 375/260; 375/340; 375/347

(58) Field of Classification Search ........... 375/131, 375/133, 136, 260, 267, 347, 349, 132, 340; 455/132, 133, 269, 272, 275; 370/343
See application file for complete search history.

(56) References Cited

U.S. PATENT DOCUMENTS

| 4,688,251 | A   |   | 8/1987  | Citron et al.            |
| 4,933,954 | A   |   | 6/1990  | Petry                    |
| 5,428,602 | A   | * | 6/1995  | Kemppainen ....... 375/133 |
| 5,548,582 | A   | * | 8/1996  | Brajal et al. ......... 375/133 |
| 6,144,711 | A   |   | 11/2000 | Raleigh et al.           |
| 6,560,299 | B1  | * | 5/2003  | Strolle et al. ......... 375/347 |
| 6,738,439 | B1  |   | 5/2004  | Okanoue et al.           |
| 6,888,876 | B1  | * | 5/2005  | Mason et al. ......... 375/132 |
| 2004/0052319 | A1 | * | 3/2004 | Wakamatsu ........... 375/343 |

(Continued)

OTHER PUBLICATIONS

International Search Report for International Patent Application No. PCT/US2005/029255, filed Aug. 16, 2005, International Search Report dated Dec. 9, 2007 and mailed Dec. 13, 2007 (3 pgs.).

(Continued)

*Primary Examiner*—Betsy L Deppe
(74) *Attorney, Agent, or Firm*—Thomas, Kayden, Horstemeyer & Risley, LLP (57) ABSTRACT

Systems and methods for packet detection for frequency hopping networks. Multiple receiver chains are set to different frequencies to check for packets at the different frequencies, at least until receipt of a preamble sequence in a packet is received. After detection of a packet at least some of the receiver chains are used to process received signals according to a frequency hopping pattern.

16 Claims, 6 Drawing Sheets

U.S. PATENT DOCUMENTS

| | | | |
|---|---|---|---|
| 2004/0062193 | A1 | 4/2004 | Ma et al. |
| 2004/0218699 | A1 | 11/2004 | Carsello |
| 2005/0226343 | A1 | 10/2005 | Levy |
| 2005/0254592 | A1 | 11/2005 | Naguib et al. |
| 2005/0255805 | A1 | 11/2005 | Hottinen |
| 2005/0255815 | A1* | 11/2005 | Hammerschmidt et al. . 455/132 |
| 2005/0268181 | A1 | 12/2005 | Murty et al. |

OTHER PUBLICATIONS

Written Opinion of the International Searching Authority for International Patent Application No. PCT/US2005/029255, filed Aug. 16, 2005, Written Opinion of the International Searching Authority t dated Dec. 10, 2007 and mailed Dec. 13, 2007 (7 pgs.).

High Rate Ultra Wideband PHY and MACStandard, ECMA-368, Dec. 2008.

* cited by examiner

PACKET DETECTION IN TIME/FREQUENCY HOPPED WIRELESS COMMUNICATION SYSTEMS

CROSS-REFERENCE TO RELATED APPLICATIONS

This application claims the benefit of U.S. Provisional Application No. 60/601,828 filed Aug. 16, 2004, the disclosure of which is incorporated herein.

BACKGROUND OF THE INVENTION

The invention relates generally to wireless communication systems, and more particularly to packet detection in wireless communication systems using time frequency codes.

Digital wireless communication systems are widespread, and there are numerous methods that may be used in wirelessly transmitting information. In many such methods information is transmitted in discrete packets. The use of discrete packets for data transfer provides a number of benefits, often including for example increased bandwidth utilization in the presence of multiple devices and standardization of overhead communication.

The discrete packets generally include a header for various overhead information and a payload for data. The overhead may include information regarding the transmitter and the intended receiver, information regarding the length of the payload, and various other types of information relating to the transmission of information. For example, in some systems a packet includes a preamble and a payload, and the preamble includes a predefined preamble sequence, a prefix, a guard interval, and possibly channel estimation symbols. The preamble sequence is a known sequence useful for detecting the presence of a packet, and the known sequence may also include sufficient information for a receiver to be able to frame the packet as well.

At times wireless communication systems may be operating in noisy environments or other environments which adversely affect received signals. In many such environments payload information may be correctly decoded through the use of appropriate error correcting coding and interleaving of data. Moreover, once a preamble is detected other functions, such as automatic gain control processing, frequency offset estimation, and channel estimation, may be performed to improve processing of received signals. Detection of the known sequence in the overhead information may be problematic, however, particularly when the environment includes multiple transmitters whose signals mutually interfere with one another.

As an example, some wireless communication systems may use multiple frequency sub-bands for transmission of information. Having any particular transmitter vary the use of frequency sub-bands over time may increase total potential communication bandwidth while also minimizing interference issues with respect to any one particular sub-band. The sequence by which the transmitter varies use of frequency sub-bands may be referred to as a time frequency code (TFC), with each TFC defining a logical communication channel. In some proposed systems the logical communication channels are not necessarily orthogonal to one another in time, space, or frequency usage. Thus, different transmitters may be transmitting at the same frequency sub-band at the same time, mutually interfering with each other's signal and increasing the difficulty of detecting preamble sequences.

SUMMARY OF THE INVENTION

In various aspects the invention provides packet detection systems and methods in frequency hopped communications systems. In one aspect the invention provides a method for detecting packets in a radio frequency (RF) communication network using orthogonal frequency division multiplexing (OFDM) in a frequency hopping manner, comprising setting a first RF receiver to receive signals in a first frequency sub-band; setting a second RF receiver to receive signals in a second frequency sub-band; checking received signals in the first frequency sub-band to determine if a first known sequence has been received; checking received signals in the second frequency sub-band to determine if a second known sequence has been received; determining if a packet has been received based on receipt of the first known sequence or receipt of the second known sequence.

In another aspect the invention provides a method of detecting receipt of a preamble sequence in a radio frequency (RF) communication network using logical channels defined by time frequency codes, the time frequency codes indicating usage of frequency sub-bands over time for transmission of orthogonal frequency division multiplexing (OFDM) symbols, comprising setting N RF receiver chains each to one of N different frequency sub-bands, N greater than one; checking signals received by the N RF receiver chains for a preamble sequence; determining that a packet has been received if any of the signals received by the N RF receiver chains comprise the preamble sequence.

In another aspect the invention provides a radio frequency (RF) receiver for receiving orthogonal frequency division multiplexing (OFDM) symbols on a frequency hopping communication channel defined by a time frequency code, comprising a plurality of mixers, each of the plurality of mixers coupled to an antenna receiving a radio frequency signal and each of the plurality of mixers receiving a mixing signal of a different frequency; a plurality of correlation circuits, each of the correlation circuits coupled to a separate mixer and each of the correlation circuits configured to determine if a received signal comprises a known sequence; a switch controlled to change states based on a frequency hopping pattern defined by a time frequency code after determination by any of the correlation circuits that the received signal comprises the known sequence; and processing circuitry coupled to the mixers, the processing circuitry including a Fast Fourier Transform (FFT) block.

These and other aspects of the invention are more fully comprehended upon consideration of this disclosure, including the accompanying figures.

BRIEF DESCRIPTION OF THE FIGURES

The number identifiers in FIG. 5 and FIG. 6 correspond to the same number identifiers in FIG. 1 except for the leading number that indicates the figure number. In addition, in FIG. 6, the maximum ratio combining block is identified as 681.

DETAILED DESCRIPTION

Figure 1:
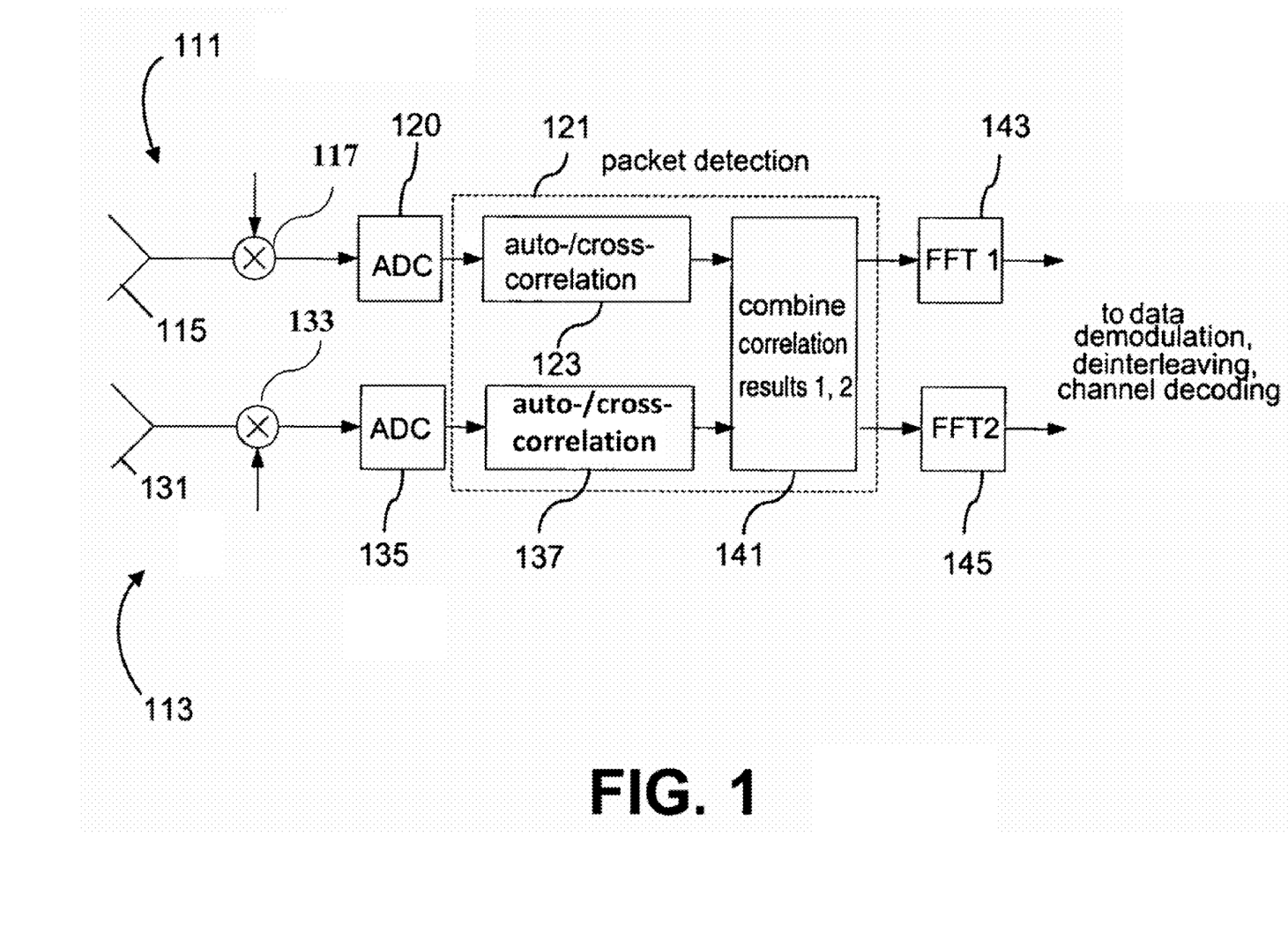
FIG. 1 is a block diagram of portions of a receiver in accordance with aspects of the invention.

FIG. 1 is a block diagram of portions of a receiver in accordance with aspects of the invention. The receiver includes a first receiver chain 111 and a second receiver chain 113. The first receiver chain includes an antenna 115. The antenna receives RF communication signals, and the RF signals are provided to a mixer 117. Generally additional components, such as a low noise amplifier (LNA), are in the signal pathway between the antenna and the mixer. The mixer also receives a mixing signal from a local oscillator (LO) (not shown), and the mixer converts the signal received by the antenna to baseband. The baseband signal is digitized by an analog-to-digital converter (ADC) 120. In some embodiments the signal is converted to an intermediate frequency signal prior to conversion to baseband.

The digital signal is provided to signal processing circuitry 121. The signal processing circuitry includes correlation circuitry 123 to detect preamble sequences. As illustrated, the correlation circuitry includes both auto-correlation circuitry and cross-correlation circuitry. The auto-correlation circuitry compares the received signal to a delayed version of the received signal and the cross-correlation circuitry compares the received signal to the preamble sequence. The use of both auto-correlation techniques and cross-correlation techniques allows for increased ability to correctly detect preamble sequences. In addition, in various embodiments an indication of the expected preamble sequence is provided to the cross-correlation by other components of or associated with the receiver. For example, in some embodiments a media access controller (MAC) of or associated with the receiver provides the cross-correlation circuitry an indication of the expected preamble sequence, which may vary with TFCs.

The second receiver chain also includes an antenna 131, a mixer 133, a LO (not shown), and an ADC 135, which are coupled in the same manner as in the first receiver chain. The digital signal for the second receiver chain is also provided to the signal processing circuitry 121, which is shared with the first receiver chain. The signal processing circuitry 121, however, includes further correlation circuitry 137, with the further correlation circuitry processing the digital signal for the second receiver chain. The further correlation circuitry also includes both auto-correlation circuitry and cross-correlation circuitry, like the correlation circuitry for the first receiver chain, and performs the same functions. In some embodiments, however, the first receiver chain and the second receiver chain each have separate signal processing circuitry.

As illustrated in FIG. 1 the signal processing circuitry also includes logic circuitry 141. The logic circuitry receives the results of the correlation circuitry of the first receiver chain and the correlation circuitry of the second receiver chain, and combines the results to determine if a preamble sequence has been received. In many embodiments this is accomplished with an OR function, with detection by either receiver chain of a preamble sequence sufficient to determine that a preamble sequence has been received.

The receiver also includes a first Fast Fourier Transform (FFT) block 143 and a second FFT block 145. The first FFT block receives data from the first receiver chain and the second FFT block receives data from the second receiver chain. As illustrated, the FFT blocks receives signals from block 141. In most embodiments, however, the FFT blocks receive signals from the ADCs, with the packet detection portion of the signal processing circuitry not in the direct signal pathway between the ADCs and the FFT blocks.

In operation, prior to detecting a packet the first receiver chain and the second receiver chain "listen" to different frequency sub-bands and attempt to detect a preamble sequence. In other words, the LO of the first receiver chain and the LO of the second receiver chain are set to different frequencies, and the mixers of the respective receiver chains convert signals at different frequencies to baseband. For example, the LO of the first receiver chain may be set to a first frequency sub-band and the LO of the second receiver chain set to a second frequency sub-band, with the mixer 117 converting a signal in the first frequency sub-band to baseband and the mixer 133 converting a signal in the second frequency sub-band to baseband.

Each receiver chain processes their respective baseband signal to determine if a preamble sequence is received. In many embodiments the preamble sequence is TFC dependent, with some or all TFCs utilizing different preamble sequences. Accordingly, in various embodiments the different receiver chains determine if different preamble sequences are received.

In some embodiments, and as shown in FIG. 1, determining if a preamble sequence is received is accomplished using a combination of auto-correlation and cross-correlation techniques. With delay-correlation (in effect an auto-correlation), the receiver buffers the incoming signal (e.g. a digitized version of the signal) and correlates it with a delayed version of the same signal. A disadvantage of delay-correlation is the fact that it does not distinguish between the known symbols of the preamble, and any periodic signal (e.g. single tone interference). With cross-correlation (can also be referred to as matched filtering), the receiver correlates the incoming signal with known preamble symbols. Although this correlation technique is more selective (more robust against interference), it is more complex to implement. In practice, a combination of auto-correlation techniques and cross-correlation techniques may be used to reliably detect the preamble sequence at reasonable complexity.

In some embodiments once a preamble sequence is detected additional processing commences. The additional processing may include automatic gain control processing to provide appropriate gain control of signals by the low noise amplifier, mixer, and other gain circuits in the receiver chain, as well as channel estimation.

Figure 2:
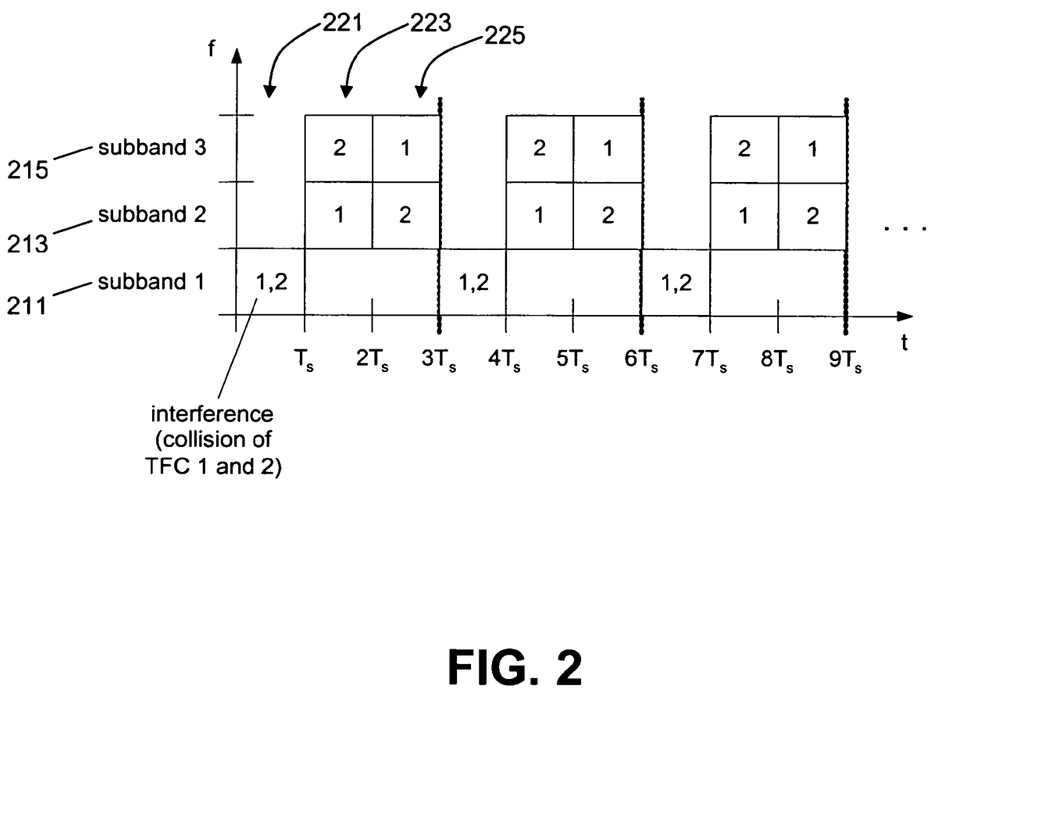
FIG. 2 is a time versus frequency plot of a first logical channel with a first frequency hopping pattern and a second logical channel with a second frequency hopping pattern.

In other embodiments, when a first preamble symbol is detected the receiver confirms preamble detection prior to performing additional processing. In some of these embodiments the receiver chain waits a predefined time period for a second occurrence of the preamble symbol to confirm the TFC. For example, FIG. 2 shows signal transmission over time for two logical channels, defined by a TFC 1 and a TFC 2. For convenience the TFCs are shown as hopping in frequency at the same time, although this may not necessarily be the case. During a first time period 221 signals for both TFC 1 and TFC 2 are present in a first frequency sub-band 211. During a second time period 223, following the first time period, a signal for TFC 1 is present in a second frequency sub-band 213 and a signal for TFC 2 is present in a third frequency sub-band 215. During a third time period 225, following the second time period, a signal for TFC 1 is present in the third frequency sub-band and a signal for TFC 2 is present in the second frequency sub-band. In the example of FIG. 2, the TFC period is three time periods, and the receiver chain therefore waits for three time periods for a second occurrence of the preamble symbol to confirm detection of the preamble symbol, and therefore packets, on a particular TFC.

After confirmation, calibration steps such as automatic gain control (AGC), frequency offset estimation, channel estimation commence using the preamble, and the payload of the packet is thereafter decoded. In somewhat more detail, automatic gain control (AGC) is preformed to control gain elements of the radio frequency (RF) part of the receiver to optimize input scaling to an analog-digital converter (ADC) of the receiver chain. Frequency offset estimation is performed to compensate for carrier frequency variation of the transmitter and receiver RF components, which typically vary by 20 ppm to 40 ppm. Channel estimation allows for improved detection and decoding of the payload data. If the calibration during preamble processing is inaccurate, it negatively effects the decoding of the entire payload data. Thus, preamble processing is a very sensitive process, and any form of interference can significantly degrade the performance, e.g. increase the packet error rate.

After detection of a packet, in some embodiments each mixer continues to receive the mixing signal for downconverting received signals in the same frequency sub-band, and signals from different receiving chains are provided to processing circuitry, such as including FFT blocks, based on the TFC. Thus, after packet detection, the mixers continue to receive the same mixing signals and a switch may selectively couple receiver chains to processing circuits to match frequency sub-band usage by a logical channel based on a TFC. In other embodiments, after packet detection both receiver chains are switchably provided mixing signals for different frequency sub-bands for downconverting different frequency sub-bands to match frequency sub-band usage by the logical channel. Thus, a switch may selectively provide mixing signals to the mixers to match usage as indicated by the TFC, with for example multiple receiving chains set to the same frequency sub-band in a time changing manner.

Figure 3:
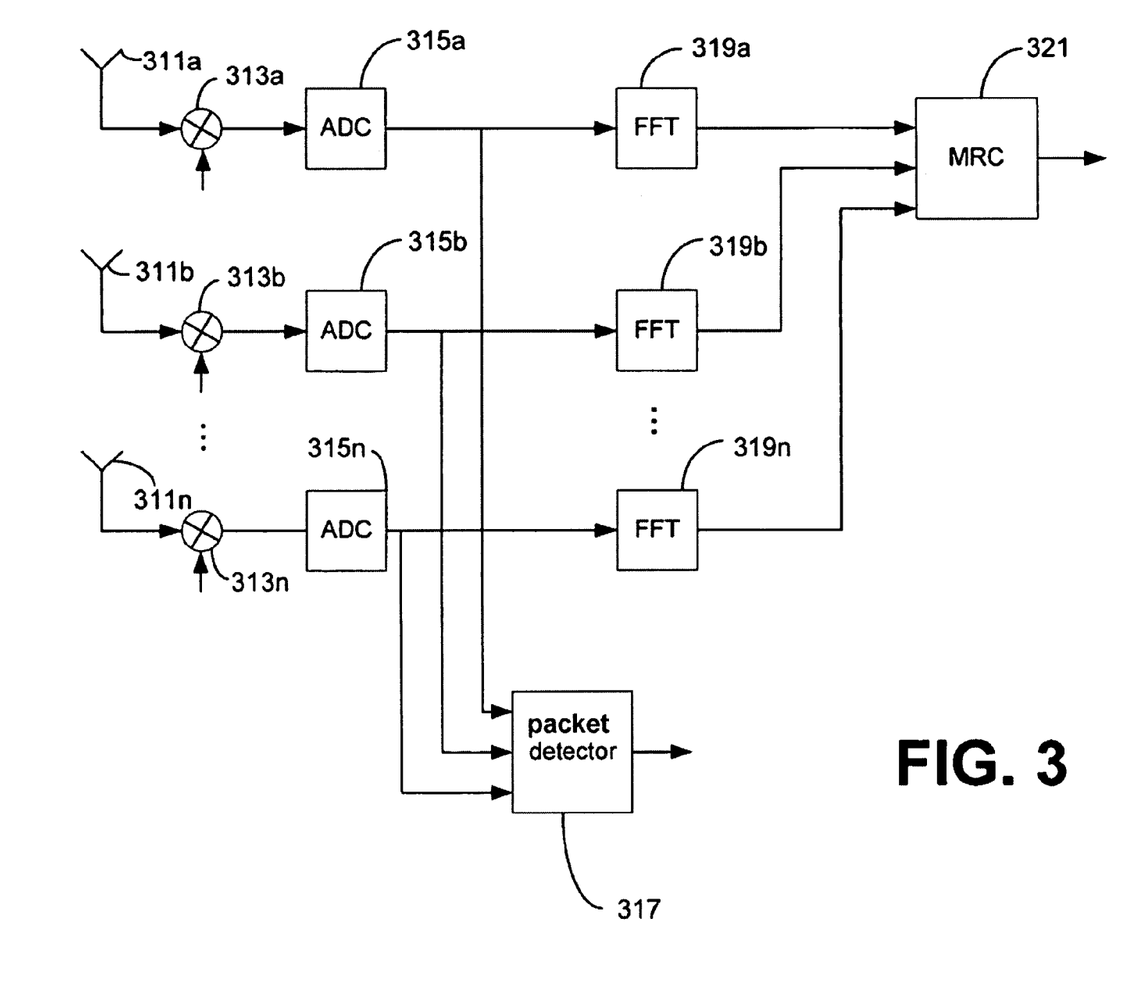
FIG. 3 is a block diagram of portions of a further receiver in accordance with aspects of the invention.

A block diagram of a further embodiment including aspects of the invention is provided by FIG. 3. The further embodiment includes N RF receiver chains. Each of the RF receiver chains includes an antenna 311*a-n*, a mixer 313*a-n*, and an ADC 315*a-n*. Generally other components are also included in the RF receiver chain, such as low noise amplifiers (LNAs), variable gain amplifiers and other circuits. Each of the N RF receiver chains is tuned to a different frequency sub-band by way of receiving signals of differing frequencies at their respective mixers.

Preferably N is equal to the number of sub-bands used for receiving communications. For example, a proposed ultrawideband system three sub-bands, each 528 MHz wide. Orthogonal frequency division multiplexing (OFDM) modulation is used, with 128 subcarriers. Each OFDM symbol is transmitted in one of the 3 sub-bands according to a hopping pattern, also referred to as a time-frequency code (TFC). Preferably N is equal to three in such a system.

As illustrated in FIG. 3, digital signals from each of the N ADCs are provided to a packet detection block 317. The packet detection block includes sequence detection circuitry for each of the N RF receiver chains, with the sequence detection circuitry preferably including both auto-correlation circuitry and cross-correlation circuitry. The packet detection block determines if a preamble sequence has been received on any of the N RF receiver chains.

Digital signals from each of the N ADCs are also provided to FFT blocks 319*a-n*. The FFT blocks convert the signals to the frequency domain. The frequency domain signals are received by an MRC block 321. The MRC block performs maximum ratio combining, which effectively increases the signal-to-noise ratio (SNR) of a received signal.

Figure 4:
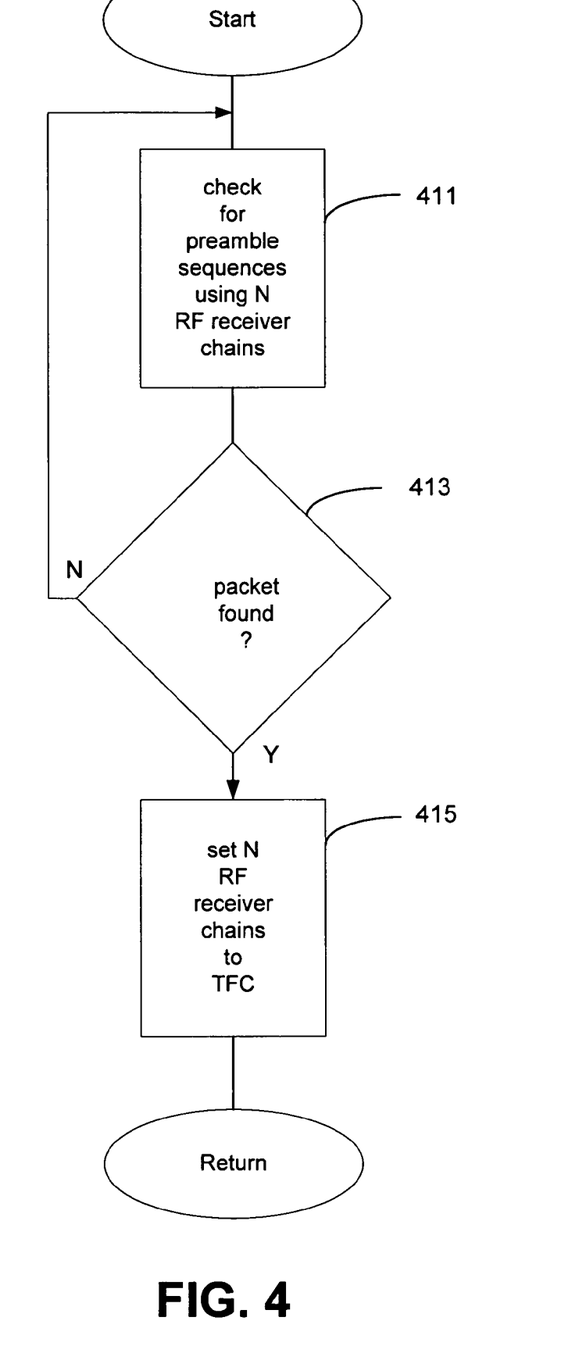
FIG. 4 is a flow diagram of a process in accordance with aspects of the invention.

In some embodiments the system of FIG. 3 uses a process in accordance with the flow diagram of FIG. 4. In block 411 of the process each of the N RF receiver chains checks a different frequency sub-band for receipt of preamble sequences. In some embodiments each of the N RF receiver chains checks for the same preamble sequence, while in other embodiments each RF receiver chain checks for a different preamble sequence.

In block 413 the process determines if a packet has been received. A packet has been received if receipt of a preamble sequence has been detected, although in various embodiments a determination of receiving a packet may also require detection of receipt of a plurality of preamble sequences. If a packet has not been received the process returns to block 411 and continues checking for preamble sequences. If a packet has been received each of the N RF receiver chains is set to process signals on the same frequency sub-band, with the frequency sub-band changing according to a hopping pattern determined according to the TFC. With each RF chain set to the same frequency sub-band, the receiver is configured as a multiple input-multiple output (MIMO) receiver, and maximum ratio combining may therefore be performed on received signals.

Figure 5:
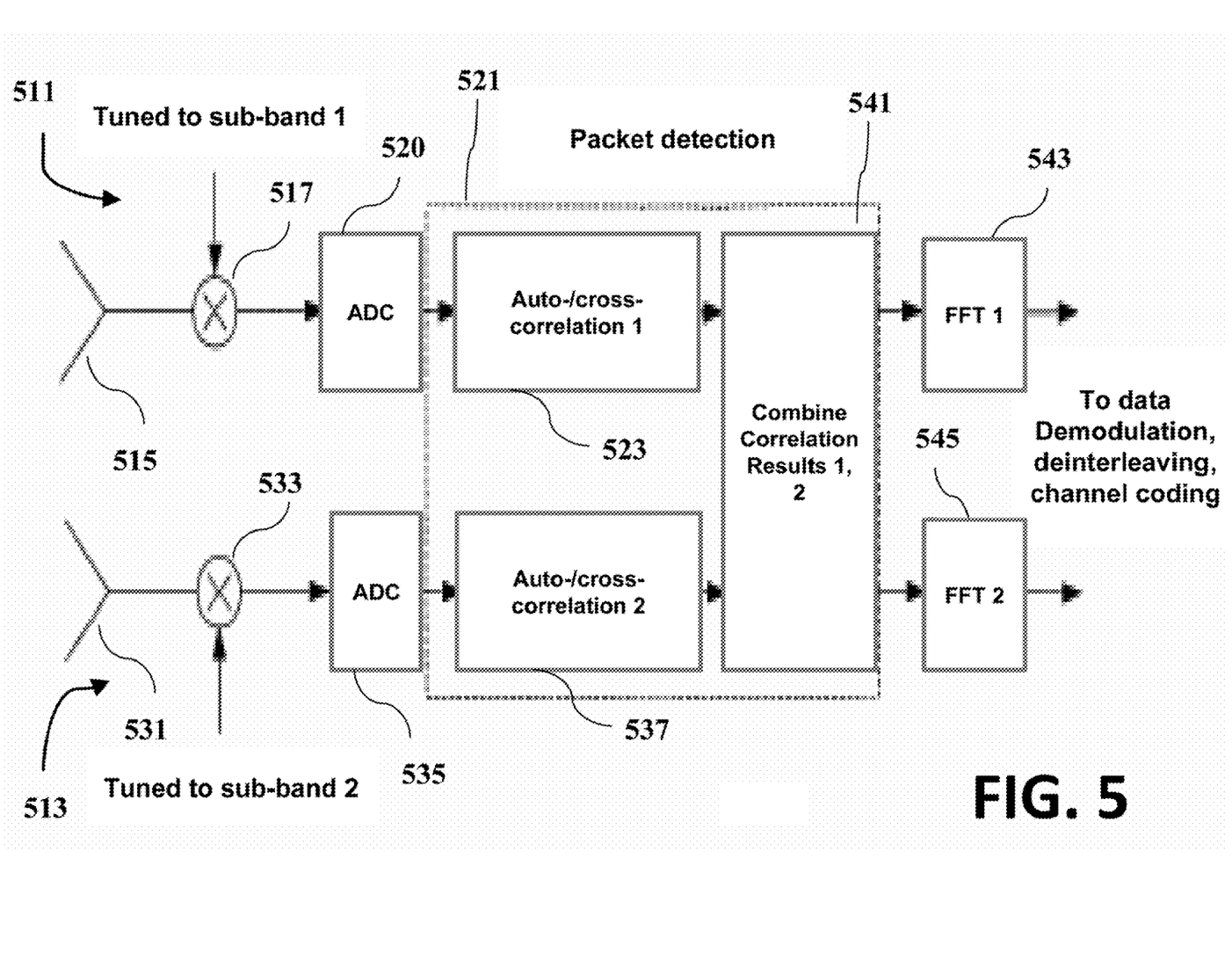
FIG. 5 is a simplified drawing of improved receiver with multiple receive antennas listening on different sub-bands during preamble processing.

Two parallel RX RF chains (i.e. two RX antennas) are used to listen to two different sub-bands of the frequency band, e.g. sub-band 1 and 2, see FIG. 5. In both sub-bands, auto and cross-correlation techniques are applied to detect a preamble symbol.

Thus, during a first period preamble processing is performed by a receiver. The receiver includes N receive RF chains. The RF chains include an antenna and a downconverter. Optionally, the receive RF chains may include additional circuitry, such as an analog to digital converter. Also optionally, each RF chain may also be provided preamble detection circuitry, such as auto-correlation circuitry, cross-correlation circuitry, or a combination of both. As illustrated in FIG. 5, however, packet detection circuitry for multiple, or all, RF chains is provided in a single cohesive block.

The RF chains are, in some embodiments initially, tuned to different frequency sub-bands. For example, each RF chain is tuned to one of N frequency sub-bands over which communications are received. Tuning of the RF chains may be performed, for example, by providing the down converter of each RF chain, or a mixer of each RF chain, a mixing signal of a different frequency.

Each RF chain processes received signals and preamble detection is performed, using the preamble detection circuitry, to determine if a preamble is present. In some embodiments preamble detection is performed with each RF chain tuned to the separate frequency sub-bands. In some embodiments, however, RF chains, whether a single RF chain or multiple RF chains, begin frequency hopping according to the TFC scheme once preamble signals are detected.

Figure 6:
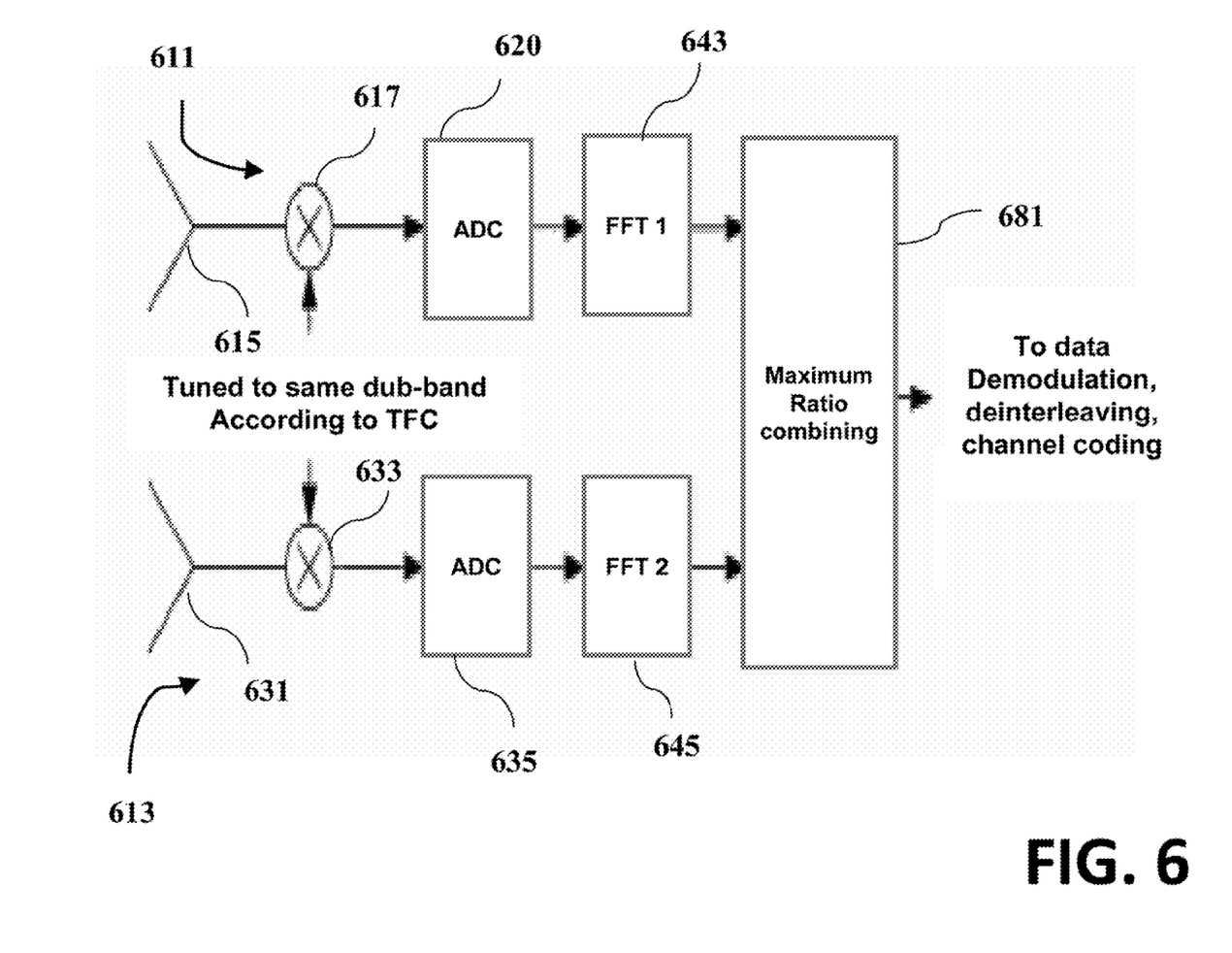
FIG. 6 shows a simplified drawing of improved receiver with multiple receive antennas receiving on the same sub-band for payload processing (after packet was detected).

While the two RX RF chains were tuned to two different— but fixed—frequencies for preamble detection (e.g. sub-band 1 and 2), they are tuned to the same frequency sub-band after preamble detection, i.e., for data detection of the payload, now following the respective TFC hopping pattern. In this mode, the signals from the two RX RF chains are coherently combined in the digital baseband using maximum-ratio combining (MRC), to increase the SNR of the signal (FIG. 6). With the two antennas IRX RF chains, detection of which two TFC's are operating at the same time, with the respective timing; this allows use of interference mitigation techniques during payload decoding, potentially reducing mutual interference and thus facilitating higher data rates.

In addition, in some embodiments the different RF receiver chains are configured to detect preamble sequences for different TFCs, even if the receiver expects to receive information on a specific TFC. Detection of multiple TFCs indicates that the receiver is receiving multiple signals, some of which may interfere with signals desired to be received by the receiver, and allows the receiver to perform interference mitigation techniques, such as use of zero-forcing or minimum mean square error estimation techniques.

Accordingly, aspects of the invention provide packet detection systems and methods. Although the invention has been described with respect to certain embodiments, it should be recognized that the invention includes the claims and supported by this disclosure and insubstantial variations thereof.

What is claimed is:

1. A method for detecting packets in a radio frequency (RF) communication network using orthogonal frequency division multiplexing (OFDM) in a frequency hopping manner, comprising:
   setting a first RF receiver to receive signals in a first frequency sub-band;
   setting a second RF receiver to simultaneously receive signals in a second frequency sub-band;
   checking received signals in the first frequency sub-band to determine if a first known sequence has been received;
   checking received signals in the second frequency sub-band to determine if a second known sequence has been received;
   determining if a packet has been received based on receipt of the first known sequence or receipt of the second known sequence; and
   selecting signals from the first RF receiver and the second RF receiver based on a hopping pattern determined according to a time frequency code after determining that a packet has been received, the time frequency code indicating usage of the first frequency sub-band and the second frequency sub-band over time for transmission of OFDM symbols.

2. The method of claim 1 wherein the first known sequence and the second known sequence are the same.

3. The method of claim 1 wherein each of the first known sequence and the second known sequence comprise a preamble sequence.

4. The method of claim 1 wherein setting the first RF receiver to receive signals in the first frequency sub-band comprises providing a mixing signal having a first frequency to a mixer in the first RF receiver and setting the second RF receiver to receive signals in the second frequency sub-band comprises providing a mixing signal having a second frequency to a mixer in the second RF receiver.

5. The method of claim 1 wherein determining if a packet has been received based on receipt of the first known sequence or receipt of the second known sequence comprises determining if either the first known sequence or the second known sequence has been received, waiting a period of time based on the hopping pattern, and determining if either the first known sequence or the second known sequence is again received approximate the conclusion of the period of time.

6. The method of claim 1 further comprising setting the first RF receiver to frequency sub-bands based on the time frequency code after determining a packet has been received.

7. The method of claim 1 further comprising performing automatic gain control and channel estimation if a packet is determined to be received.

8. A method of detecting receipt of a preamble sequence in a radio frequency (RF) communication network using logical channels defined by time frequency codes, the time frequency codes indicating usage of frequency sub-bands over time for transmission of orthogonal frequency division multiplexing (OFDM) symbols, comprising:
   setting each of N RF receiver chains each simultaneously to one of N different frequency sub-bands, wherein N is greater than one;
   checking signals received by the N RF receiver chains for a preamble sequence;
   determining that a packet has been received if any of the signals received by the N RF receiver chains comprise the preamble sequence; and
   selecting signals from the N RF receiver chains based on a hopping pattern determined according to the time frequency code after determining that a packet has been received.

9. The method of claim 8 wherein the communication network uses N logical channels defined by time frequency codes.

10. The method of claim 9 further comprising setting the N RF receiver chains to the same frequency sub-band after determining that a packet has been received.

11. The method of claim 10 further comprising performing maximum ratio combining on received information after setting the N RF receiver chains to the same frequency sub-band.

12. The method of claim 11 further comprising repeatedly setting the N RF receiver chains to frequencies in accordance with a time frequency code.

13. A radio frequency (RF) receiver for receiving orthogonal frequency division multiplexing (OFDM) symbols on a frequency hopping communication channel defined by a time frequency code, comprising:
   a plurality of mixers, each of the plurality of mixers coupled to an antenna receiving a radio frequency signal and each of the plurality of mixers simultaneously receiving a mixing signal of a different frequency;
   a plurality of correlation circuits, each of the correlation circuits coupled to a separate mixer and each of the correlation circuits configured to determine if a received signal comprises a known sequence, wherein each correlation circuit includes both auto-correlation circuitry and cross-correlation circuitry;
   a logic circuitry that combines the correlation results based on a frequency hopping pattern defined by a time frequency code after determination by any of the correlation circuits that the received signal comprises the known sequence; and
   processing circuitry coupled to the mixers, the processing circuitry including a Fast Fourier Transform (FFT) block.

14. The receiver of claim 13 wherein the logic circuitry couples the mixing signals of different frequencies to different mixers based on the correlation results of the logic circuitry.

15. The receiver of claim 14 wherein the processing circuitry further comprises a maximum ratio combining (MRC) block.

16. The receiver of claim 13 wherein each mixer is part of a different RF receiver chain, and the logic circuitry couples the different RF receiver chains to the processing circuitry based on the state of the logic circuitry.

* * * * *